United States Patent [19]

Öhlschlager et al.

[11] B 3,923,507

[45] Dec. 2, 1975

[54] SENSITIZED ELECTROPHOTOGRAPHIC LAYERS

[75] Inventors: Hans Öhlschlager, Cologne; Oskar Riester, Leverkusen, both of Germany; Theofiel Hubert Ghys, Kontich, Belgium; Karel Eugeen Verhille, Hoboken, Belgium; Johannes Josephus Vanheertum, Halle-Zand-Hoven, Belgium

[73] Assignee: Agfa-Gevaert Aktiengesellschaft, Leverkusen-Bayerwerk, Germany

[22] Filed: Mar. 19, 1973

[21] Appl. No.: 342,886

[44] Published under the Trial Voluntary Protest Program on January 28, 1975 as document no. B 342,886.

[30] Foreign Application Priority Data

Mar. 23, 1972  Germany............................ 2214054

[52] U.S. Cl. .......................... 96/1.6; 96/1.5; 96/1.7
[51] Int. Cl.² ...................... G03G 5/04; G03G 5/06
[58] Field of Search ............... 96/1.6, 1.7, 127, 130, 96/132, 134

[56] References Cited
UNITED STATES PATENTS

| | | | |
|---|---|---|---|
| 2,743,272 | 4/1956 | Knott | 96/132 |
| 3,047,384 | 7/1962 | Jones et al. | 96/1.7 |
| 3,288,610 | 11/1966 | Gotze et al. | 96/1.7 X |
| 3,438,774 | 4/1969 | Depoorter et al. | 96/1.7 |
| 3,455,684 | 7/1969 | Depoorter et al. | 96/1.7 |
| 3,468,661 | 9/1969 | Libeer et al. | 96/1.7 |
| 3,476,558 | 11/1969 | Depoorter et al. | 96/1.7 |
| 3,574,629 | 4/1971 | Jenkins | 96/130 |
| 3,622,316 | 11/1971 | Bird et al. | 96/1.7 |
| 3,623,883 | 11/1971 | Bannert et al. | 96/1.7 X |
| 3,630,749 | 12/1971 | Webster et al. | 96/1.7 X |
| 3,743,638 | 7/1973 | Webster et al. | 96/1.7 X |

FOREIGN PATENTS OR APPLICATIONS

| | | | |
|---|---|---|---|
| 1,103,334 | 2/1968 | United Kingdom | 96/132 |

*Primary Examiner*—Roland E. Martin, Jr.
*Attorney, Agent, or Firm*—Connolly and Hutz

[57] ABSTRACT

Electrophotographic recording materials are spectrally sensitized with a polymethine sensitizing dye containing a thiazole ring which is connected in 5-position through a methine chain to a 5- or 6-membered heterocyclic ring.

1 Claim, No Drawings

SENSITIZED ELECTROPHOTOGRAPHIC LAYERS

This invention relates to the spectral sensitization of electrophotographic materials, in particular those which contain zinc oxide or organic photoconductors.

It is known that photoconductive layers, which generally have their characteristic sensitivity in the ultraviolet region of the spectrum, can be sensitized to visible light by the addition of dyes which transmit radiant energy. The dyes which have been proposed for this purpose belong to various classes of dyes, e.g., triphenylmethane dyes, phenol sulphonphthaleins, xanthene and acridine dyes as well as cyanines, merocyanines and oxonoles, which belong to the class of polymethine dyes.

The known dyes have, however, the disadvantage that they either do not increase the sensitivity sufficiently or cause excessive colouring of the electrophotographic layer which is generally required to be colorless or almost colourless. Discoloration of the layer is a particularly serious disadvantage in electrophotographic materials because the sensitizing dyes used cannot be washed out by the usual methods of processing, nor can they be destroyed by baths. Eliminating the discoloration by bleaching the sensitizing dyes after the image has been produced is complicated and not economically feasible.

It is an object of the present invention to develop a spectrally sensitized electrophotographic material in which the recording layer is highly sensitive but almost colorless and its sensitivity is stable in storage.

It has now been found that this requirement is fulfilled by a spectrally sensitized electrophotographic material in which the photoconductive layer contains as sensitizing dye a dye with a thiazole ring which is linked in the 5-position to a second heterocyclic ring via a methine groupl This invention thus relates to an electrophotographic material which contains a cyanine dye characterised by one of the following structural formulae I or II:

methyl, ethyl, or an (3) aryl group, for example phenyl which may be substituted for example with alkyl,
$R^3$ is a group of the formula $-SR^9$ or $-NR^{10}R^{11}$,
$R^5$, $R^6$, $R^7$ is
1. a hydrogen atom,
2. a saturated or unsaturated aliphatic group preferably containing up to three carbon atoms, for example methyl or ethyl,
3. an aryl group, for example a phenyl group or
4. a carbalkoxy group such as a carbethoxy group, and $R^5$ and $R^6$ may also together represent the ring members required to complete a condensed benzene or naphthalene ring;

$R^9$, $R^{10}$, $R^{11}$ represent
1. a saturated or unsaturated aliphatic group preferably containing up to six carbon atoms such as methyl or ethyl or
2. an aryl group such as phenyl;

$R^{10}$ and $R^{11}$ may also together represent the ring members required to complete a heterocyclic ring, e.g., to complete a pyrrolidone, piperidine, morpholine or thiomorpholine ring, indoline or tetrahydroquinoline ring;

$n = 0$ or 1;
$m = 0$ or 1;

Anion $^-$ represents an anion, e.g., a halide such as chloride, bromide or iodide, perchlorate, sulfate, methyl sulfate, p-toluenesulfonate, acetate, oxalate and the like; the anion is absent in cases where $R^1$, $R^4$ or $R^6$ contains an acid group in the anionic form so that a betaine is present;

Z is a radical required to complete a heterocyclic group which has a 5- or 6-membered heterocyclic ring; the heterocyclic group may contain a condensed benzene or naphthalene ring and further substituents; suitable heterocyclic groups are those commonly used in cyanine chemistry, for example those based on thiazole, (e.g., thiazole, 4-methylthiazole, 5-methylthiazole, 4,5-

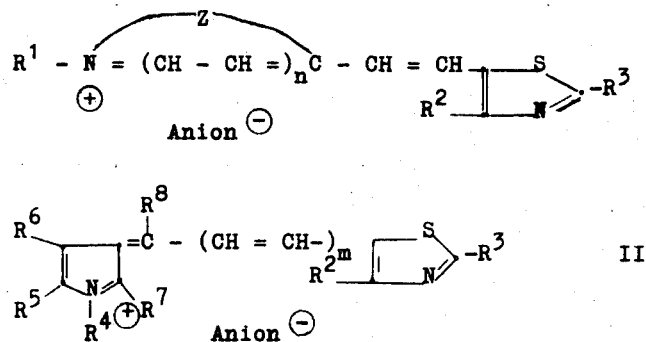

in which
$R^1$ is
1. a saturated or unsaturated aliphatic hydrocarbon group which preferably contains up to six carbon atoms and may be substituted, e.g., with phenyl, hydroxyl, halogen, carboxyl, sulfo carbonamido, carbalkoxy, sulfato or thiosulfato, sulfonamido or a phosphate group,
2. a cycloalkyl group such as a cyclohexyl group,
3. an aryl group, in particular a phenyl group, $R^2$, $R^8$, $R^4$ represent (1) a hydrogen atom, or (2) a saturated or unsaturated aliphatic hydrocarbon group containing preferably up to six carbon atoms, for example dimethylthiazole, 4-phenylthiazole, 5-phenylthiazole or 4,5-diphenylthiazole), those based on benzothiazole (e.g., benzothiazole, 4-chlorobenzothiazole, 5-chlorobenzothiazole,6-chlorobenzothiazole, 7-chlorobenzothiazole, 5-bromobenzothiazole,6-iodobenzothiazole, 6-iodobenzothiazole, 4-methylbenzothiazole, 5-methylbenzothiazole, 6-methylbenzothiazole,5,6-dimethylbenzothiazole, 4-phenylbenzothiazole, 5-phenylbenzothiazole,6-phenylbenzothiazole, 5-hydroxybenzothiazole, 6-hydroxybenzothiazole, 5-ethoxybenzothiazole, 6-ethoxybenzothiazole, 5,6-dimethoxybenzothiazole,5,6-methylenedihydroxybenzothiazole,5-diethylaminobenzothiazole, 6-diethylaminobenzothiazole, 6-cyanobenzothiazole,5-carboxybenzothiazole, 5-sulfobenzothiazole, tetrahydrobenzothiazole or 7-oxotetrahydrobenzothiazole), naphthothiazole (e.g., naphtho [1,2-d]thiazole, naphtho [2,1-d]thiazole,7methoxynaphtho[2,1-d]thiazole or 8-methoxynaphtho[1,2-d]thiazole), selenazole (e.g., 4-methylselenazole, or 4-phenylselenazole), benzoselenazole (e.g., benzoselenazole, 5-chlorobenzoselenazole, 5,6-dimethylbenzoselenazole, 5-hydroxybenzoselenazole, 5-methoxybenzoselenazole or tetrahydrobenzoselenazole), naphthoselenazole (e.g., naphtho[1,2-d]selenazole or naphtho[2,1-d]selenazole, oxazole (e.g., oxazole,4-methyloxazole, 4-phenyloxazole or 4,5-diphenyloxazole),benzoxazole (e.g., benzoxazole, 5-chlorobenzoxazole, 6-chlorobenzoxazole,5,6-dimethylbenzoxazole, 5-phenylbenzoxazole, 5-hydrobenzooxazole, 5-methoxybenzoxazole, 5-phenylbenzoxazole, 5-hydroxybenzoxazole, 5-methoxybenzoxazole, 5-ethoxybenzoxazole, 6-dialkylaminobenzoxazole, 5-carboxybenzoxazole, 5-sulfobenzoxazole, sulfonamidobenzoxazole or 5-carboxyvinylbenzoxazole), naphthoxazole (e.g., naphtho[1,2-d]oxazole, naphtho[2,1-d]oxazole or naphtho[2,3-d]oxazole), imidazole (e.g., 1-methylimidazole, 1-ethyl-4-phenylimidazole or 1-butyl-4,5-dimethylimidazole), benzimidazole (e.g., 1-methylbenzimidazole, 1-butyl-4-methylbenzimidazole, 1-ethyl-5,6-dichlorobenzimidazole or 1-ethyl-5-trifluoromethylbenzimidazole), naphthimidazole (e.g., 1-methylnaphtho-[1,2-d]imidazole or 1-ethylnaphtho[2,3-d]imidazole), 3,3-dialkylindolenine (e.g., 3,3-dimethylindolenine, 3,3,5-trimethylindolenine or 3,3-dimethyl-5-methoxyindolenine), 2-pyridine (e.g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine,4,6-dimethylpyridine, 4-chloropyridine, 5-chloropyridine, 6-chloropyridine, 3-hydroxypyridine, 4-hydroxypyridine, 5-hydroxypyridine, 3-phenylpyridine, 4-phenylpyridine or 6-phenylpyridine), 4-pyridine (e.g., 2-methylpyridine, 3-methylpyridine, 2,3-dimethylpyridine, 2,5-dimethylpyridine, 2,6-dimethylpyridine, 2-chloropyridine, 3-chloropyridine, 2-hydroxypyridine or 3-hydroxypyridine), 2-quinoline (e.g., quinoline, 3-methylquinoline, 5-methylquinoline, 7-methylquinoline, 8-methylquinoline, 6-chloroquinoline,8-chloroquinoline,6-methoxyquinoline, 6-ethoxyquinoline, 6-hydroxyquinoline, 8-hydroxyquinoline or 5-oxo-5,6,7,8-tetrahydroquinoline), 4-quinoline (e.g., quinoline, 6-methoxyquinoline, 7-methylquinoline or 8-methylquinoline), isoquinoline (e.g., isoquinoline or 3,4-dihydroisoquinoline), thiazoline (e.g., thiazoline or 4-methylthiazoline), as well as those based on pyrroline, tetrahydropyridine, thiadiazole, oxadiazole, pyrimidine, triazine or benzothiazine, pyrimidone or thiopyrimidone. The aryl groups and heterocyclic groups may in turn be substituted with any substituents, e.g., with alkyl groups which preferably contain up to three carbon atoms such as methyl or ethyl, with halogen such as chlorine or bromine, hydroxyl, alkoxy preferably with up to three carbon atoms such as methoxy, or ethoxy, hydroxyalkyl, alkylthio, aryl such as phenyl or aralkyl such as benzyl, amino, substituted amino, nitro and the like.

The following are examples of suitable compounds. The absorption maxima were determined in methanolic solution unless otherwise indicated. DMSO in the following Table denotes dimethylsulfoxide.

| No. | Dye | Absorption maximum (nm) |
|---|---|---|
| 1. | 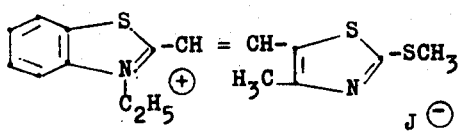 | 447 |
| 2. | 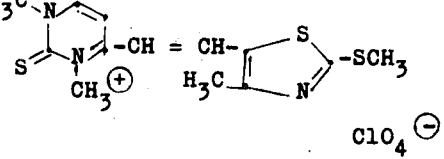 | 478 |
| 3. | 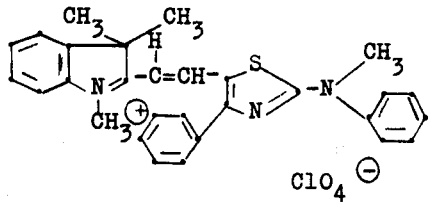 | 540 (Aceton) |

-Continued
| No. | Dye | Absorption maximum (nm) |
|---|---|---|
| 4. | 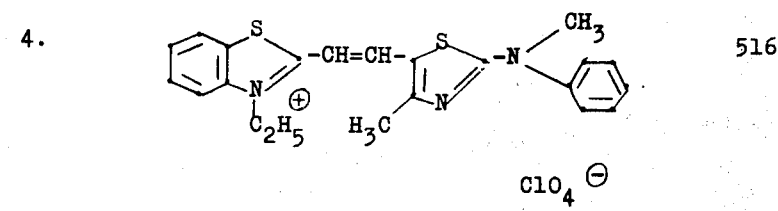 | 516 |
| 5. | 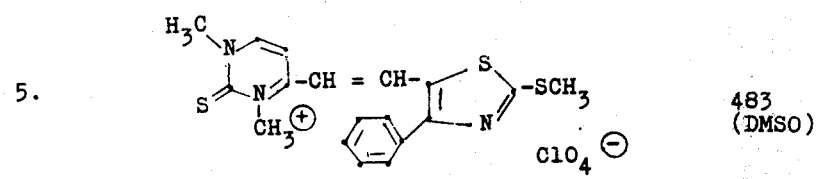 | 483 (DMSO) |
| 6. | 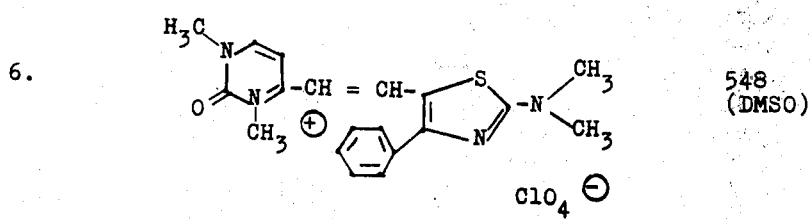 | 548 (DMSO) |
| 7. | 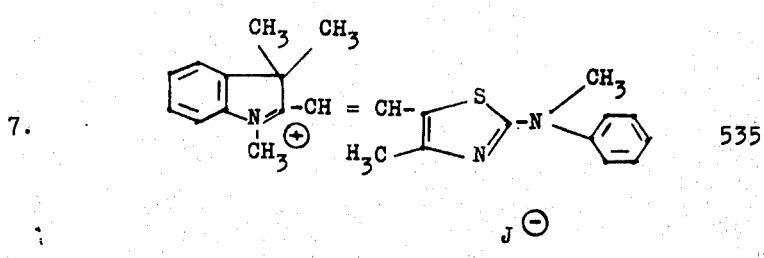 | 535 |
| 8. | 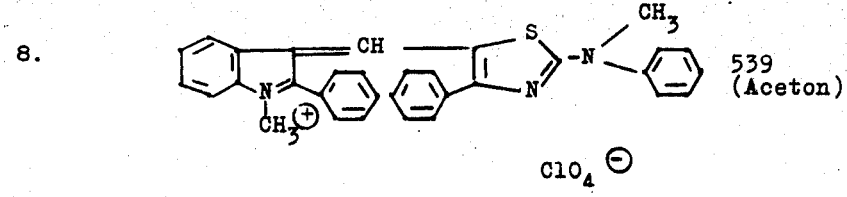 | 539 (Aceton) |
| 9. | 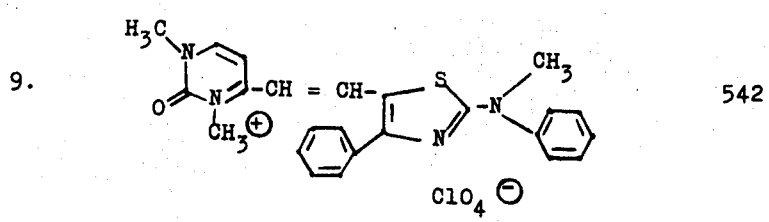 | 542 |
| 10. | 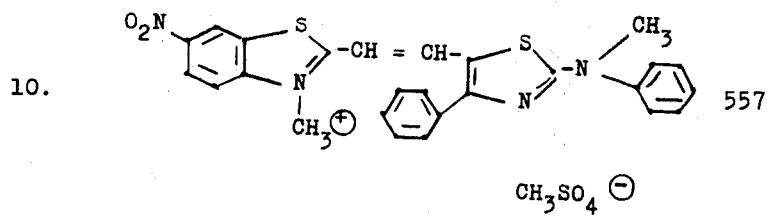 | 557 |

| No. | Dye | Absorption maximum (nm) |
|---|---|---|
| 11. | 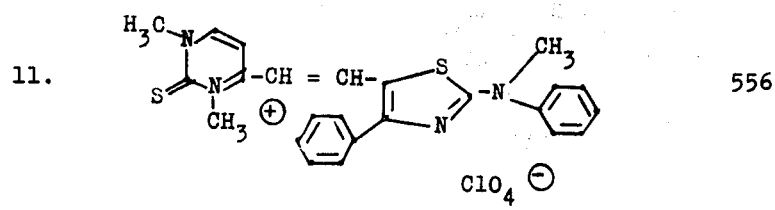 | 556 |
| 12. | 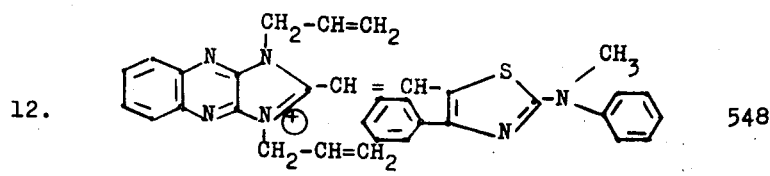 | 548 |
| 13. | 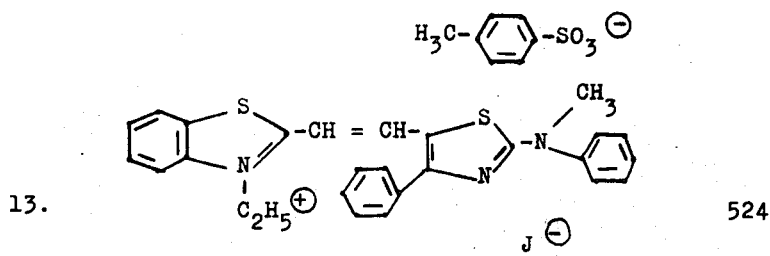 | 524 |
| 14. | 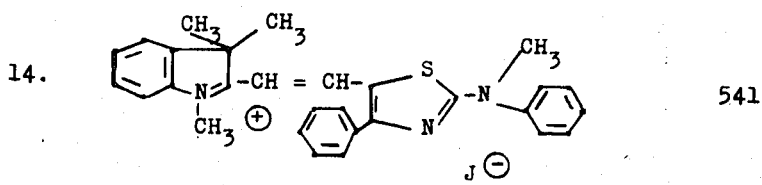 | 541 |
| 15. | 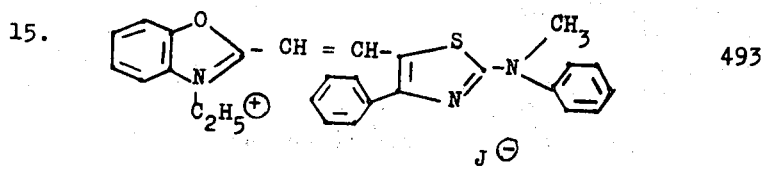 | 493 |
| 16. | 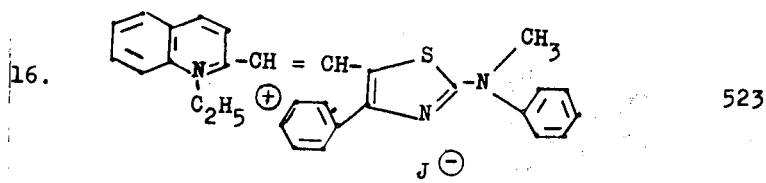 | 523 |
| 17. | 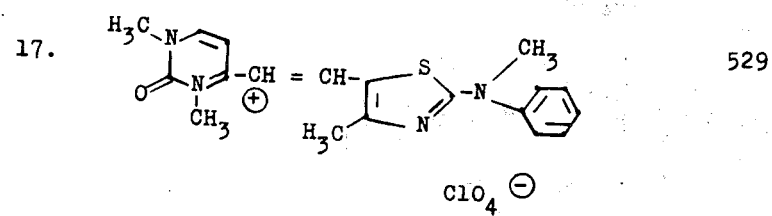 | 529 |

—Continued

| No. | Dye | Absorption maximum (nm) |
|---|---|---|
| 18. | (structure) | 546 |
| 19. | (structure) | 542 |
| 20. | (structure) | 468 |
| 21. | (structure) | 549 |
| 22. | (structure) | 540 (Aceton) |
| 23. | (structure) | 550 (Aceton) |
| 24. | (structure) | 561 |

| No. | Dye | Absorption maximum (nm) |
|---|---|---|
| 25. | 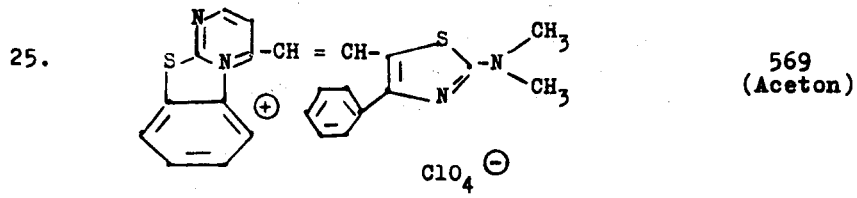 | 569 (Aceton) |
| 26. | 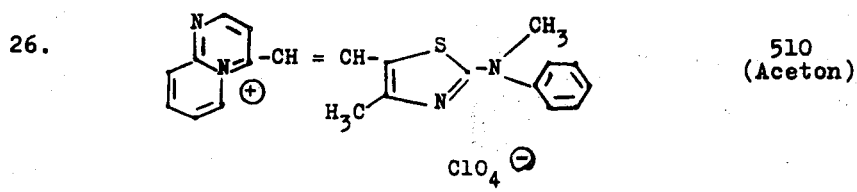 | 510 (Aceton) |
| 27. | 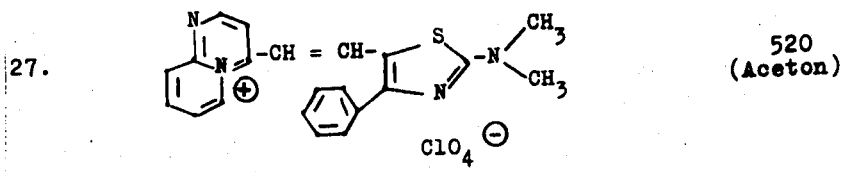 | 520 (Aceton) |
| 28. | 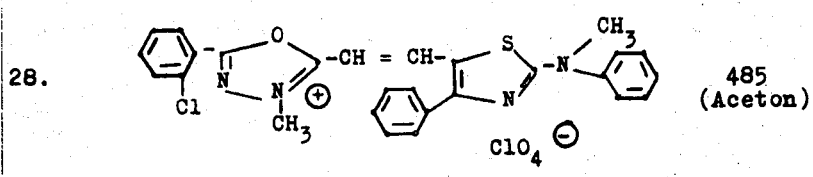 | 485 (Aceton) |
| 29. | 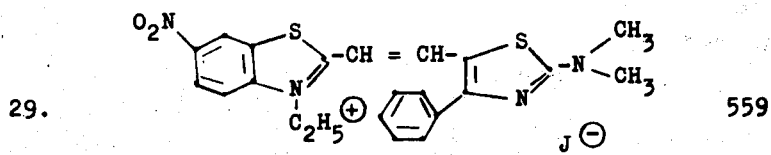 | 559 |
| 30. | 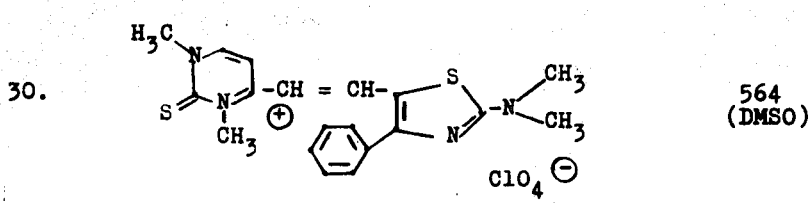 | 564 (DMSO) |
| 31. | 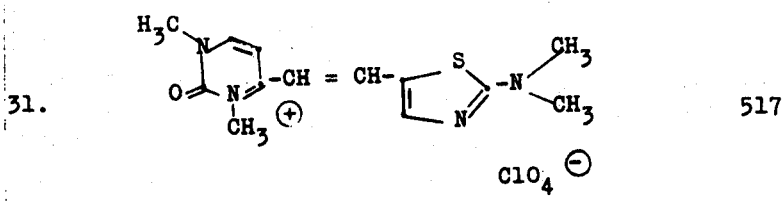 | 517 |
| 32. | 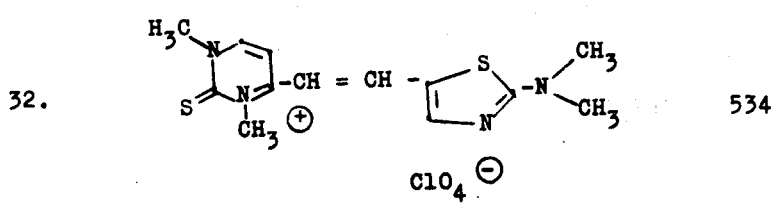 | 534 |

—Continued

| No. | Dye | Absorption maximum (nm) |
|---|---|---|
| 33. | 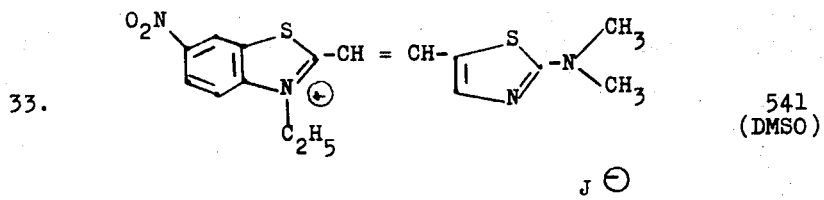 | 541 (DMSO) |

The cyanine dyes of formula I above can easily be prepared by reacting a heterocyclic compound of the following formula III.

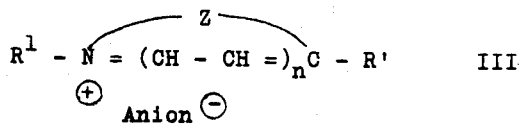

in which $R^1$, n, Z and anion have the meanings already indicated and R' represents a methyl group with a thiazole aldehyde of the following structural formula IV

in which $R^2$ and $R^3$ have the meanings already indicated above. The reaction is preferably carried out at temperatures of from about 15°C to the reflux temperatures of the mixture, preferably using the reactants in equimolar or approximately equimolar ratios. The reaction may be carried out with or without a condensing agent such as a trialkylamine in the presence of an inert solvent, for example an alkanol such as ethanol or acetic acid anhydride.

Dyes of Formula II are obtained by condensation of a pyrrole or indole of Formula V

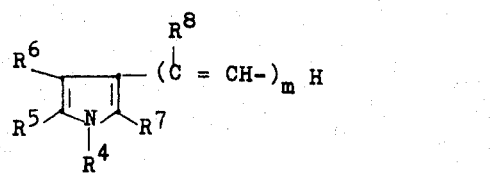

in which $R^4$, $R^5$, $R^6$, $R^7$, $R^8$ and m have the meanings already indicated, with an aldehyde of the formula IV with the addition of at least one mol of an acid such as acetic acid. Condensation may advantageously also be carried out in glacial acetic acid with the addition of a condensing agent such as phosphorus oxychloride. Thiazole aldehydes of formula Iv may easily be prepared from the corresponding thiazoles by a Vilsmeir reaction as described in German Patent Nos. 1,137,024 and 1,147,584.

The preparation of Dyes 1, 6 and 8 is described in detail below.

Dye 1

3.3 g of 2-Methyl-3-ethyl-benzothiazolium tosylate and 1.7 g of 2-methylmercapto-4-methyl-thiazole aldehyde-5 in 10 ml of acetic acid anhydride to which 1.2 ml of triethylamine has been added are heated to reflux for 15 minutes. The solution is cooled and the dye is precipitated with potassium iodide solution, suction filtered and recrystallized twice from 100 ml of methanol with the addition of active charcoal. 1.7 g of dye, m.p. 226°C (decomposition) are obtained.

Dye 6

2.4 g of 1,3,6-Trimethyl-2-oxo-pyrimidinium perchlorate and 2.3 g of 2-dimethylamino-4-phenyl-thiazole aldehyde-5 in 20 ml of acetic acid anhydride are heated to reflux for 15 minutes. The dye precipitates after brief heating. The mixture is cooled and the dye is suction filtered and recrystallized from 250 ml of glacial acetic acid. 4.2 g, m.p. 277°C (decomposition).

Dye 8

2.0 g of 1-Methyl-2-phenyl-indole and 3.0 g of 2-methylphenylamino-4-phenyl-thiazole aldehyde-5 in 10 ml of glacial acetic acid are heated under reflux for 1 hour with the addition of 2 ml of phosphorus oxychloride. The solution of the dye is cooled and dye is precipitated with sodium perchlorate solution, suction filtered and recrystallized from 150 ml of alcohol. 1.6 g, m.p.: 160°162°C.

The dyes according to the invention are particularly suitable for the spectral sensitization of inorganic photoconductors dispersed in binders, particularly of zinc oxide, as well as of organic photoconductors. The binders used for this process maybe any of the usual film-forming substances used in electrophotography such as silicone resins, alkyd resins, polyurethanes or polyvinyl acetate.

The dyes are generally added in the form of solutions to the dispersions of inorganic photoconductive substances or solutions of organic photoconductive substances which are to be sensitized. The methods employed for this are generally known in the art.

The sensitizing dyes may be incorporated in the usual manner in the coating liquid used for preparing the photoconductive layer. The optimum quantity of sensitizing dye can be determined by simple tests and is generally between 0.01 and 20 mg of dye per gram of photoconductive substance.

Not only the commonly known inorganic photoconductive substances such as zinc oxide but also organic substances known as photoconductors may be used for preparing the electrophotographic recording material according to the invention.

The usual binders may also be used for the preparation of the photoconductive layers or alternatively recording layers free from binder may be prepared in known manner using suitable organic photoconductive substances.

The proportion of photoconductive substance to binder may vary within wide limits. It depends on the purpose for which the recording material is to be used and on the nature of the photoconductive substance. When using zinc oxide, for example, a ratio of 1 part by weight of photoconductor to 0.1 – 2.0 parts by weight of binder yields satisfactory results.

In addition to the dyes according to the invention, photoconductive substances and binders, the photoconductive layers may also contain other spectral sensitizers (see e.g., British Pat. No. 1,020,504), substances for adjusting the viscosity, age resistors, pigments (see British Pat. No. 1,007,349) or substances of the kind described in Belgian Pat. No. 612,102.

The photoconductive materials according to the invention may be used for the usual electrophotographic processes, for example for development processes carried out with solid toners in the form of loose powder, aerosol development processes, electrophoretic processes, so-called wetting development processes and the like. The materials according to the invention are suitable both for the processing of electrostatic images and for the processing of conductivity images.

EXAMPLE 1

100 mg of dye in the form of a 0.1 percent solution in dimethyl formamide are added in each case to a mixture of 20 g of photoconductive zinc oxide, 20 ml of toluene, 11 ml of ethyl acetate, 0.66 ml of a 10 percent solution of tetrachlorophthalic acid anhydride in alcohol, and 4.5 g of a 50 percent solution of a copolymer of vinyl acetate, acrylic acid ester and acrylic acid (% by weight 87 : 12 : 1) in a mixture of toluene, 1,2-dichloroethane and ethyl acetate (percent by volume 1 : 1 : 4). The mixture is applied to a baryta paper support (25 g of zinc oxide per m²) and dried. After being charged, the resulting electrophotographic material is exposed behind a step wedge (density difference 0.1) to a light intensity of 2,280 Lux from a 450 Watt incandescent lamp for 15 seconds and then developed by a conventional development process using a toner powder. The sensitivity of the layers is obtained from the number of steps at which no toner particles are deposited and at which therefore the original density of the material has been preserved. The greater the number of these steps, the higher is the sensitivity.

The dye quoted for comparison is the known sensitizer Rhodamine B (Color Index 45 170).

Table 1

| Dye | Sensitization maximum (nm) | Steps |
|---|---|---|
| none | — | 14 |
| Rhodamine B | 555 | 24 |
| 4 | 535 | 25 |
| 6 | 560 | 25 |
| 9 | 560 | 24 |
| 10 | 575 | 23 |
| 17 | 545 | 24 |
| 21 | 560 | 25 |
| 22 | 565 | 26 |
| 23 | 570 | 26 |
| 25 | 580 | 26 |
| 26 | 535 | 25 |
| 27 | 540 | 26 |
| 29 | 570 | 27 |
| 30 | 570 | 24 |
| 31 | 530 | 25 |
| 32 | 545 | 25 |
| 33 | 550 | 27 |

EXAMPLE 2

A solution of 0.05 g of the dye and 4 g of 1-ethyl-3-phenyl-7-diethylamino-2-(1H)-quinoline in a mixture of 50 ml of methylene chloride and 50 ml of acetone is applied in each case to an aluminium coated paper so that the layer contains 2 g of photoconductive substance per m² when dry.

Each sample is negatively charged with a corona discharge at a potential difference of 6,000 V and then exposed behind a step wedge (density difference 0.2) to 2,000 Lux from an incandescent lamp at a distance of 25 cm for 15 seconds. The latent image is developed electrophoretically using a developer obtained by preparing a 15/1,000 dilution in Shellsol T (Trade name for a hydrocarbon mixture) of the following conccentrated developer solution:

| Carbon black (average diameter 20 nm) | 30 g |
| Zinc monotridecylphosphate | 1.5 g |
| Shellsol T (Trade name) | 750 ml |
| Solution of binder | 150 g |

The solution of binder is prepared by heating 500 g of Alkydal L 67 (Trade name of Bayer AG. of an alkyd resin solution) in 500 ml of ligroin to 60°C until a clear solution is obtained and cooling the solution. Relative sensitivity values are obtained by comparing the number of visible steps of the sensitized material with the number of visible steps of the unsensitized material, taking the relative sensitivity of the unsensitized material to be 100.

Table 2

| Dye | Relative sensitivity |
|---|---|
| none | 100 |
| Rhodamine B | 2500 |
| 1 | 2500 |
| 3 | 1600 |
| 4 | 2500 |
| 6 | 1600 |
| 8 | 2500 |
| 9 | 4000 |
| 11 | 2500 |
| 12 | 4000 |
| 13 | 1600 |
| 14 | 2500 |
| 16 | 1600 |
| 20 | 1600 |
| 21 | 4000 |
| 28 | 6000 |

EXAMPLE 3

Mixtures are prepared in each case from 6 g of the photoconductive substance, 4 g of a copolymer of vinyl chloride, vinyl acetate and maleic acid anhydride (molar ratio 86.5 : 13.3 : 0.2), 0.05 g of sensitizing dye, 90 ml of 1,2-dichloroethane and 10 ml of methylene chloride. The photoconductor used is a compound of the following formula:

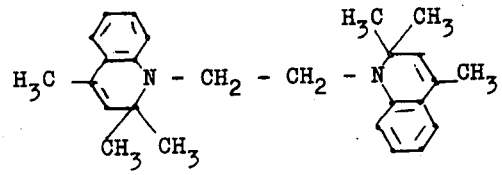

The mixtures are applied to an aluminium backed paper so that the layers contain 3 g of photoconductor per m². The dry layers are negatively charged with a negative corona discharge at a potential difference of 6,000 V, exposed to a 100 Watt incandescent lamp at a distance of 30 cm behind a step wedge (density difference 0.2) for 5 seconds and then developed as described in Example 2. The results obtained are summarized in the following Table.

and in the photoconductor a sensitizing dye compound of one of the following formulae:

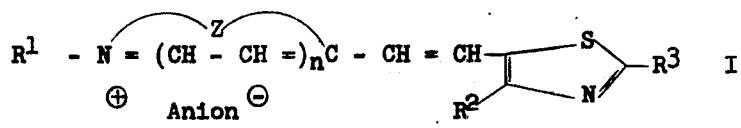

and

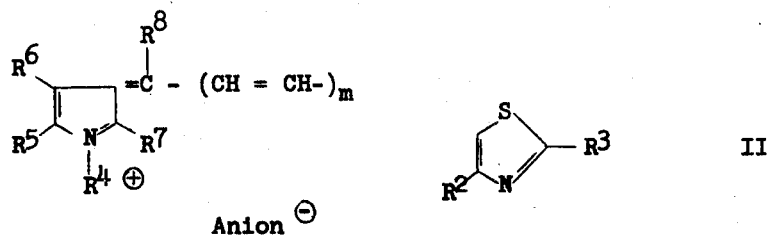

Table 3

| Dye | Relative sensitivity |
| --- | --- |
| none | 60 |
| Rhodamine B | 1600 |
| 2 | 1600 |
| 5 | 1600 |
| 7 | 1600 |
| 10 | 1600 |
| 12 | 1600 |
| 14 | 2500 |
| 15 | 1600 |
| 22 | 2500 |
| 23 | 4000 |
| 25 | 1600 |
| 29 | 2500 |
| 30 | 1600 |
| 32 | 1600 |

We claim:
1. An electrophotographic recording material having a layer support and at least one sensitized photoconductive layer containing a photoconductor and a sensitizing dye, wherein the improvement comprises embedded in a binder a photoconductor selected from the group consisting of zinc oxide, 1-ethyl-3-phenyl-7-diethylamino-2-(1H)-quinoline, the photoconductor compound of the following formula:

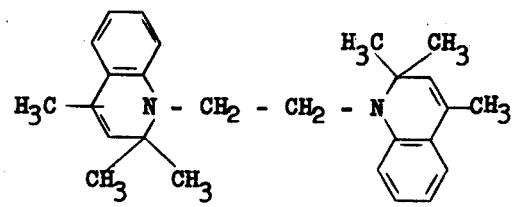

in which $R^1$ is a saturated or unsaturated aliphatic group having up to six carbon atoms and which may be substituted, a cyclohexyl or a phenyl group;

$R^2$, $R^4$ and $R^8$ is a hydrogen atom or a saturated or unsaturated aliphatic group having up to six carbon atoms or a phenyl group;

$R^3$ is an —$SR^9$ or $NR^{10}R^{11}$ group;

$R^5$, $R^6$ is a hydrogen atom a saturated or unsaturated aliphatic group having up to three carbon atoms, or $R^5$ and $R^6$ together represent the ring members required to complete a condensed benzene or naphthalene ring;

$R^7$ is a hydrogen atom, a saturated or unsaturated aliphatic group having up to three carbon atoms or a phenyl group;

$R^9$, $R^{10}$ and $R^{11}$ is a saturated or unsaturated aliphatic group containing up to six carbon atoms; or R and R together denote a radical required to complete a heterocyclic ring selected from the group consisting of pyrrolidone, piperidine, morpholine, thiomorpholine, indoline and tetrahydroquinoline rings;

$n$ is 0 or 1;

$m$ is 0 or 1;

Anion⁻ is an anion selected from the group consisting of a halide, perchlorate, sulfate, methyl sulfate, p-toluene-sulfonate, acetate and oxalate, this being absent in cases where $R^1$, $R^4$ or $R^6$ contains an acid group in the anionic form so that a betaine is present;

Z is a radical required to complete a heterocyclic group comprising a 5- or 6-membered heterocyclic ring of the type used in cyanine dyes.

* * * * *